US012705959B2

(12) United States Patent
Ohashi et al.

(10) Patent No.: US 12,705,959 B2
(45) Date of Patent: Aug. 11, 2026

(54) NOTIFICATION DEVICE, NOTIFICATION METHOD, RECORDING MEDIUM, AND NOTIFICATION SYSTEM

(71) Applicant: Panasonic Intellectual Property Management Co., Ltd., Osaka (JP)

(72) Inventors: Yoshiki Ohashi, Osaka (JP); Kazuhiro Kuroyama, Osaka (JP); Hiroki Urabe, Osaka (JP); Satoru Matsunaga, Osaka (JP); Hiromu Ikeuchi, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 326 days.

(21) Appl. No.: 18/697,968

(22) PCT Filed: Aug. 30, 2023

(86) PCT No.: PCT/JP2023/031611
§ 371 (c)(1),
(2) Date: Apr. 2, 2024

(87) PCT Pub. No.: WO2025/046818
PCT Pub. Date: Mar. 6, 2025

(65) Prior Publication Data
US 2026/0188088 A1 Jul. 2, 2026

(51) Int. Cl.
*G08B 3/10* (2006.01)
*G06F 3/16* (2006.01)

(52) U.S. Cl.
CPC ................ *G08B 3/10* (2013.01); *G06F 3/16* (2013.01); *G06F 3/167* (2013.01)

(58) Field of Classification Search
CPC .............. G08B 3/10; G06F 3/16; G06F 3/167
See application file for complete search history.

(56) References Cited

U.S. PATENT DOCUMENTS 9,523,585 B2 * 12/2016 Thirumale .............. G06F 3/167
9,848,271 B2 * 12/2017 Lyren ...................... H04S 7/303
11,748,177 B2 * 9/2023 Ohashi .................... G06F 3/165 719/318
12,342,137 B2 * 6/2025 Popovich ............... H04R 1/406
12,593,100 B2 * 3/2026 Ishii ................. H04N 21/44218
2011/0015769 A1 1/2011 Heydron et al.
(Continued)

FOREIGN PATENT DOCUMENTS

JP 2011-517165 A 5/2011
JP 2011-114681 A 6/2011
(Continued)

OTHER PUBLICATIONS

International Search Report dated Oct. 24, 2023 issued in International Patent Application No. PCT/JP2023/031611.

*Primary Examiner* — John A Tweel, Jr.
(74) *Attorney, Agent, or Firm* — Rimon P.C.

(57) ABSTRACT

A notification device includes: an outputter that outputs a sound according to a predetermined condition after outputting notification start information, when the predetermined condition is met; an obtainer that obtains notification start information output from another notification device; and a controller that controls whether to cause the outputter to output the sound, based on timing at which the notification start information from the other notification device is obtained.

11 Claims, 6 Drawing Sheets

(56) References Cited

U.S. PATENT DOCUMENTS

| | | | | |
|---|---|---|---|---|
| 2012/0207215 | A1 | 8/2012 | Ryu et al. | |
| 2023/0117212 | A1* | 4/2023 | Ohashi | G10L 15/30 704/251 |

FOREIGN PATENT DOCUMENTS

| | | | |
|---|---|---|---|
| JP | 2015-061284 | A | 3/2015 |
| JP | 2017-151718 | A | 8/2017 |
| WO | 2009/112070 | A1 | 9/2009 |

* cited by examiner

Figure 2:
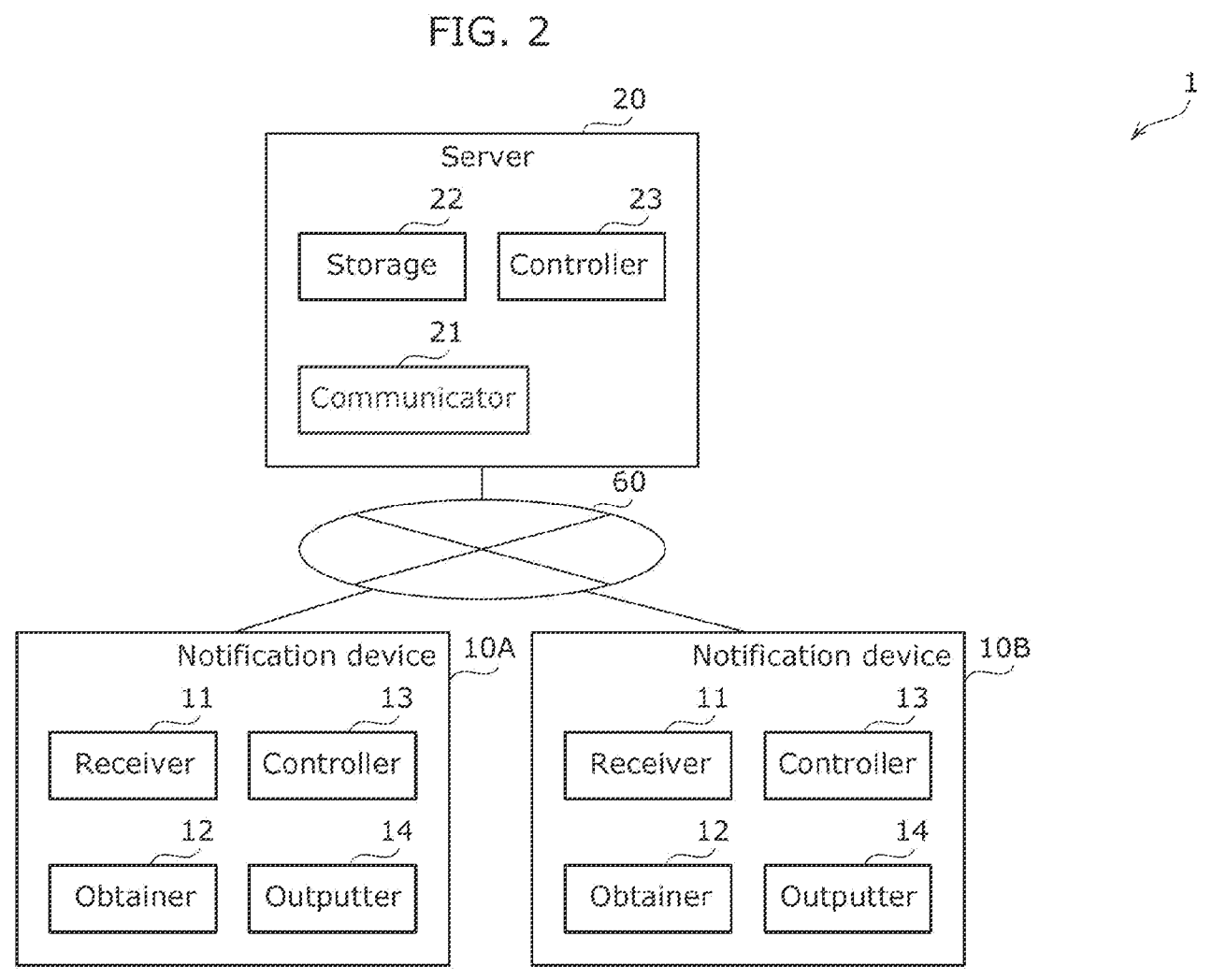

20 Server
22 Storage
23 Controller
21 Communicator

60

10A Notification device
11 Receiver
13 Controller
12 Obtainer
14 Outputter

10B Notification device
11 Receiver
13 Controller
12 Obtainer
14 Outputter

NOTIFICATION DEVICE, NOTIFICATION METHOD, RECORDING MEDIUM, AND NOTIFICATION SYSTEM

CROSS-REFERENCE OF RELATED APPLICATIONS

This application is the U.S. National Phase under 35 U.S.C. § 371 of International Patent Application No. PCT/JP2023/031611, filed on Aug. 30, 2023, the entire disclosure of which Application is incorporated by reference herein.

TECHNICAL FIELD

The present disclosure relates to a notification device, a notification method, a recording medium, and a notification system.

BACKGROUND ART

Patent Literature (PTL) 1 discloses causing a home appliance, which has a sound input and output function, to emit a sound by instructing the home appliance on the content and timing of emission.

CITATION LIST

Patent Literature

[PTL 1] Japanese Unexamined Patent Application Publication No. 2017-151718

SUMMARY OF INVENTION

Technical Problem

The present disclosure provides a notification device, and so on, that allows a user to hear an output sound easily, even if there are a plurality of notification devices that receive a notification instruction for outputting the sound.

Solution to Problem

A notification device according to an aspect of the present disclosure includes: an outputter that outputs a sound according to a predetermined condition after outputting notification start information, when the predetermined condition is met; an obtainer that obtains notification start information output from an other notification device; and a controller that controls whether to cause the outputter to output the sound, based on timing at which the notification start information from the other notification device is obtained.

A notification method according to an aspect of the present disclosure includes: starting sound output process, when a predetermined condition is met, the sound output process being outputting a sound according to the predetermined condition after outputting notification start information; obtaining notification start information output from an other notification device; and controlling whether to output the sound, based on timing at which the notification start information from the other notification device is obtained.

A notification system according to an aspect of the present disclosure includes: a server; and a first notification device and a second notification device communicably connected to the server. The first notification device includes: a first receiver that receives a notification instruction from the server; and a first outputter that outputs a sound according to the notification instruction received, after outputting notification start information, when the first receiver receives the notification instruction. The second notification device includes: a second receiver that receives the notification instruction from the server; a second outputter that outputs a sound according to the notification instruction received, when the second receiver receives the notification instruction; an obtainer that obtains notification start information output from the first notification device; and a controller that controls whether to cause the second outputter to output the sound, based on timing at which the notification start information from the first notification device is obtained.

Advantageous Effects of Invention

The notification device according to the present disclosure allows the user to hear an output sound easily, even if there are a plurality of notification devices that receive a notification instruction for outputting the sound.

BRIEF DESCRIPTION OF DRAWINGS

FIG. 2 shows an example configuration of the notification system according to the embodiment.

Figure 1:
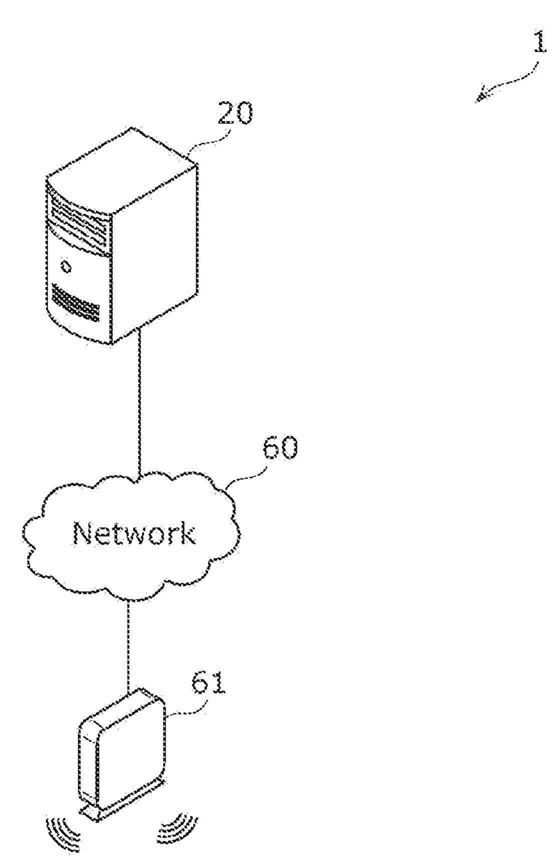
FIG. 1 is for illustrating an outline of a notification system according to an embodiment.
Figure 1:
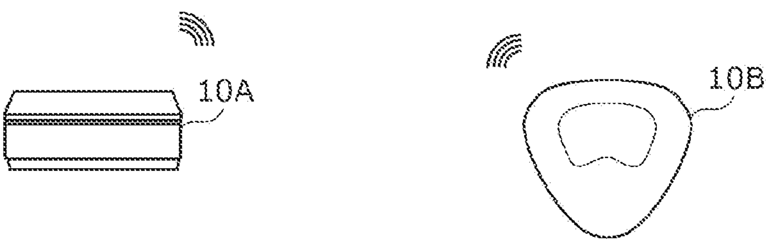

DESCRIPTION OF EMBODIMENT (Underlying Knowledge Forming Basis of the Present Disclosure)

As in the background art, when a notification device receives a notification instruction to emit a predetermined sound, there may be a plurality of notification devices, which output the predetermined sound, in the same space. In this case, the notification devices output the same sound. If the notification devices receive the notification instruction from a server, for example, and output a sound according to the notification instruction, there may be time differences until the notification devices output the sound. These time differences are caused by the differences in the transmission speed or the processing speed among the notification devices. That is, the lower the transmission speed and the processing speed are, the longer time is required to output the sound. In this manner, if the notification devices output the same sound at the different times, the user has difficulty in hearing the sound due to the time difference in the output sound.

Accordingly, the present inventors have conceived of a notification device, and so on, that allows the user to hear an output sound easily, even if there are a plurality of notification devices that receive a notification instruction for outputting the sound.

A notification device according to a first aspect of the present disclosure includes: an outputter that outputs a sound according to a predetermined condition after outputting notification start information, when the predetermined condition is met; an obtainer that obtains notification start information output from an other notification device; and a controller that controls whether to cause the outputter to output the sound, based on timing at which the notification start information from the other notification device is obtained.

This configuration controls whether to output a sound, based on the timing at which the notification start information from the other notification device is obtained. This reduces the sound output, for example, if there is a large time difference from when the other notification device outputs a sound. If there is a small time difference, the notification device can output the same sound, together with the other notification device. Accordingly, even if the predetermined condition is met and there are a plurality of notification devices that output the sound, the user can hear the output sound easily.

A notification device according to a second aspect of the present disclosure is an embodiment of the notification device according to the first aspect. The notification device is communicably connected to a server via a network. The notification device further includes a receiver that receives a notification instruction from the server. The predetermined condition is that the receiver receives the notification instruction.

Accordingly, even if there are a plurality of notification devices that receive the notification instruction for outputting the sound and output the same sound, the user can hear the output sound easily.

A notification device according to a third aspect of the present disclosure is an embodiment of the notification device according to the first or second aspect. When the timing is included in a period before the outputter has output the notification start information, the controller prevents the outputter from outputting the sound.

Assume that notification start information is obtained from the other notification device before the outputter outputs notification start information. In this case, it can be determined that there is a large time difference from when the other notification device outputs a sound. This reduces the output of the sound with a delay in the same period.

A notification device according to a fourth aspect of the present disclosure is an embodiment of the notification device according to the third aspect. When the timing is included in a period before the outputter has output the notification start information, the controller prevents the outputter from outputting the notification start information.

Assume that notification start information is obtained from the other notification device before the outputter outputs notification start information. In this case, it can be determined that there is a large time difference from when the other notification device outputs a sound. This reduces the output of the notification start information.

A notification device according to a fifth aspect of the present disclosure is an embodiment of the notification device according to the second aspect. When the timing is included in a period before the receiver receives the notification instruction, the controller does not receive the notification instruction until a first time period elapses from the timing.

With this configuration, no notification instruction is received until the first time period elapses after obtaining the notification start information from the other notification device. Accordingly, even if the notification instruction has been received with a delay, the output of the sound, which is the same as the sound output by the other notification device, with a delay from the other notification device, can be reduced.

A notification device according to a sixth aspect of the present disclosure is an embodiment of the notification device according to any one of the first to fifth aspects. When the timing is included in a period from when the outputter has output the notification start information until when a second time period elapses, the controller causes the outputter to output the sound.

Assume that notification start information is obtained from the other notification device in the period from when the outputter has output the notification start information until when the second time period elapses. In this case, it can be determined that there is a small time difference from when the other notification device outputs a sound. The notification device can output the same sound, together with the other notification device. Accordingly, one of the notification device and the other notification device obtains notification start information from the other. This reduces the problem that neither of the devices outputs any sound, that is, the problem that neither the notification device nor the other notification device outputs any sound even after receiving a notification instruction.

A notification device according to a seventh aspect of the present disclosure is an embodiment of the notification device according to any one of the first to sixth aspects. When the timing is included in a period after a second time period elapses from when the outputter has output the notification start information, the controller prevents the outputter from outputting the sound.

With this configuration, notification start information is obtained from the other notification device in the period from when the outputter has output the notification start information until when the second time period elapses. It can be determined that there is a large time difference from when the other notification device outputs a sound, which reduces the output of the same sound.

A notification device according to an eighth aspect of the present disclosure is an embodiment of the notification device according to any one of the first to seventh aspects. The outputter outputs a jingle as the notification start information. The obtainer obtains the notification start information from the other notification device by detecting the jingle in a space around the notification device.

Accordingly, the output of the notification start information and the obtainment of the notification start information can be achieved by a simple configuration.

A notification method according to a ninth aspect of the present disclosure includes: starting sound output process, when a predetermined condition is met, the sound output process being outputting a sound according to the predetermined condition after outputting notification start information; obtaining notification start information output from an other notification device; and controlling whether to output the sound, based on timing at which the notification start information from the other notification device is obtained.

This configuration controls whether to output a sound, based on the timing at which the notification start information from the other notification device is obtained. This reduces the output of the same sound, for example, if there is a large time difference from when the other notification device outputs a sound. If there is a small time difference, the notification device can output the same sound, together with the other notification device. Accordingly, even if the predetermined condition is met and there are a plurality of notification devices that output the sound, the user can hear the output sound easily.

A recording medium according to a tenth aspect of the present disclosure is a non-transitory computer-readable recording medium having recorded thereon a program for causing a computer to execute the notification method according to the ninth aspect.

A notification system according to an eleventh aspect of the present disclosure includes: a server; and a first notification device and a second notification device communicably connected to the server. The first notification device includes: a first receiver that receives a notification instruction from the server; and a first outputter that outputs a sound according to the notification instruction received, after outputting notification start information, when the first receiver receives the notification instruction. The second notification device includes: a second receiver that receives the notification instruction from the server; a second outputter that outputs a sound according to the notification instruction received, when the second receiver receives the notification instruction; an obtainer that obtains notification start information output from the first notification device; and a controller that controls whether to cause the second outputter to output the sound, based on timing at which the notification start information from the first notification device is obtained.

This configuration controls whether to output a sound, based on the timing at which the notification start information from the other notification device is obtained. This reduces the output of the same sound, for example, if there is a large time difference from when the other notification device outputs a sound. If there is a small time difference, the notification device can output the same sound, together with the other notification device. Accordingly, even if the predetermined condition is met and there are a plurality of notification devices that receive the notification instruction for outputting the sound, the user can hear the output sound easily.

Note that these general and specific aspects of the present disclosure may be implemented using a device, an integrated circuit, a computer program, or a non-transitory computer-readable recording medium such as a CD-ROM, or any combination of devices, methods, systems, integrated circuits, computer programs, or non-transitory computer-readable recording media.

Now, an embodiment will be described in detail with reference to the drawing as appropriate. Unnecessarily detailed description may be however omitted. For example, detailed description of already well-known matters and duplicated description of substantially the same configurations may be omitted. This is for avoiding unnecessarily redundant description and for easier understanding by those skilled in the art.

Note that the inventors provide the appended drawings and the following description for sufficient understanding of the present disclosure by those skilled in the art and do not intend to limit the subject matters of the claims by the appended drawings and the following description.

EMBODIMENT

[1. Configuration]

FIG. 1 is for illustrating an outline of a notification system according to an embodiment.

Specifically, FIG. 1 shows notification devices 10A and 10B, server 20, network 60, and router 61. Among these components, notification system 1 includes notification devices 10A and 10B and server 20, for example. Notification devices 10A and 10B and server 20 are communicably connected to each other via network 60. Router 61 is a device that relays the communicative connection of notification devices 10A and 10B to network 60.

Notification system 1 provides the user with a predetermined notification item as follows. Server 20 transmits a notification instruction to notification devices 10A and 10B. Notification devices 10A and 10B then outputs a sound according to the notification instruction. For example, server 20 transmits a notification instruction to notification devices 10A and 10B in the form of a push notification. The notification instruction may include no sound indicating a notification item. Alternatively, notification devices 10A and 10B may store a plurality of notification items in advance. The notification instruction may be for instructing notification devices 10A and 10B to reproduce a sound indicating one of the notification items stored in notification devices 10A and 10B. That is, the notification instruction may include information designating the notification item to be reproduced among the notification items.

FIG. 2 shows an example configuration of the notification system according to the embodiment.

Notification system 1 includes notification devices 10A and 10B and server 20. FIG. 2 shows no router 61. Notification devices 10A and 10B are, for example, owned by the same user. For example, server 20 stores the respective device information on notification devices 10A and 10B in association with the identifier of the same user.

Notification device 10A includes receiver 11, obtainer 12, controller 13, and outputter 14. For example, notification device 10A is a home appliance that can make a notification by a sound. The home appliance may be a virtual private assistant (VPA) terminal, such as a smart speaker, an autonomous vacuum cleaner, a refrigerator, a washing machine, an air conditioner, a TV, or any other suitable device.

Receiver 11 receives a notification instruction from server 20 via network 60. For example, receiver 11 may be a communication interface (IF). Receiver 11 may be a wired or wireless communication interface. Receiver 11 is connected to network 60 not necessarily via router 61 but may be connected to network 60 via a communication line, such as a mobile phone communication network.

Obtainer 12 obtains notification start information output from the other notification device (i.e., notification device 10B). Obtainer 12 may obtain the notification start information by detecting a jingle in a space around notification device 10A. Alternatively, obtainer 12 may obtain the notification start information by detecting a sound other than a jingle in a space around notification device 10A. The "sound other than a jingle" may be other than a sound according to the predetermined conditions in notification device 10A. For example, the sound may be for informing the user that there will be a notification by a sound. For example, obtainer 12 may detect, as a jingle, a sound within a predetermined frequency band and with a pressure larger than a predetermined sound pressure for a predetermined time or more. Obtainer 12 may obtain the notification start information by receiving a predetermined wireless signal, such as a Bluetooth signal. Obtainer 12 for detecting a jingle may be a microphone. Obtainer 12 for receiving a predetermined wireless signal may be a wireless communication interface.

Controller 13 controls whether to cause outputter 14 to output a sound, based on the timing at which the notification start information output from the other notification device is obtained. Specifically, controller 13 may prevent outputter 14 from outputting any sound, if the timing at which the notification start information output from the other notification device is obtained is included in a period before outputter 14 outputs the notification start information. In this case, controller 13 may prevent outputter 14 from outputting any notification start information.

Controller 13 may receive no notification instruction until a first time period elapses after the timing at which the notification start information output from the other notification device is obtained, if the timing is included in a period before receiver 11 receives the notification start information. The first time period is, for example, based on the reproduction timing of reproducing a sound in accordance with the notification instruction. The first time period may be, for example, longer than or equal to the maximum reproduction time among a plurality of notification items. Accordingly, controller 13 can receive a next notification instruction after the other notification device has ended reproducing the sound.

Controller 13 may cause outputter 14 to output a sound, if the timing at which the notification start information output from the other notification device is obtained is included the period from when outputter 14 has output the notification start information until when a second time period elapses. The second time period may be shorter than 0.5 seconds, for example.

Controller 13 may prevent outputter 14 from outputting any sound, if the timing at which the notification start information output from the other notification device is obtained is included in the period from when outputter 14 has output the notification start information until when the second time period elapses.

Controller 13 may be a control circuit, such as a processor.

When any of predetermined conditions is met in a notification device, outputter 14 outputs a sound according to the predetermined condition, after outputting notification start information. The predetermined conditions in the notification device include, for example, that receiver 11 receives a notification instruction. That is, assume that receiver 11 receives a notification instruction from server 20. In this case, outputter 14 outputs a sound according to the received notification instruction, after outputting notification start information. Outputter 14 may output a jingle or a sound other than a jingle as the notification start information. In this case, outputter 14 is a speaker. Outputter 14 may output a predetermined wireless signal, such as a Bluetooth signal, as the notification start information. In this case, outputter 14 may include a speaker and a communication IF.

Notification device 10B has the same configuration as notification device 10A, the detailed description thereof will thus be omitted.

Server 20 includes communicator 21, storage 22, and controller 23.

Communicator 21 exchanges information with notification devices 10A and 10B via network 60. Specifically, communicator 21 transmits a notification instruction to notification devices 10A and 10B. Communicator 21 may be a wired or wireless communication interface, for example.

Storage 22 stores information indicating the addresses of notification devices 10A and 10B as the destinations of the notification instruction. Storage 22 may store a plurality of notification instructions, if the notification instruction includes a notification item in the form of sound data. Storage 22 stores the respective device information on notification devices 10A and 10B in association with the identifier of the same user. Storage 22 may store, for each of a plurality of users, the device information on one or more notification devices owned by the user. The device information may include information indicating the addresses of notification devices 10A and 10B. Storage 22 may store the history of notifications to notification devices 10A and 10B.

If any of predetermined conditions is met in server 20, controller 23 causes communicator 21 to transmit a predetermined notification instruction to notification devices 10A and 10B. The expression "any of predetermined conditions is met in server 20" may mean, for example, that a predetermined time has come, that predetermined information has been received, or a predetermined operation has been performed predetermined times.

[2. Operation]

Now, an operation of notification device 10A will be described. Note that notification device 10B performs the same operation and the description thereof will thus be omitted.

Figure 3:
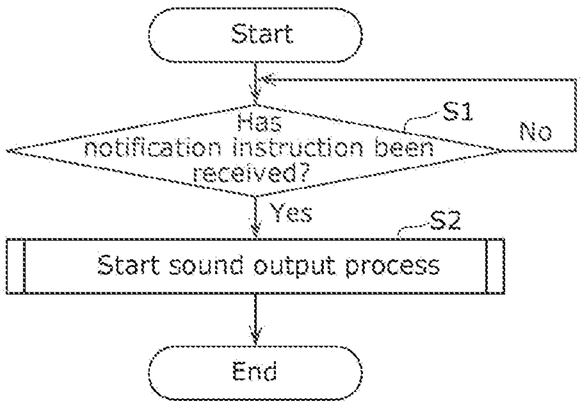
FIG. 3 is a flowchart showing example notification control in a notification device.

FIG. 3 is a flowchart showing example notification control in the notification device.

Notification device 10A determines whether a notification instruction has been received from server 20 via network 60 (S1).

If a notification instruction is determined to have been received from server 20 via network 60 (Yes in S1), notification device 10A executes step S2. On the other hand, if no notification instruction is determined to have been received from server 20 via network 60 (No in S1), the process returns to step S1.

In step S2, notification device 10A starts sound output process (S2).

Figure 4:
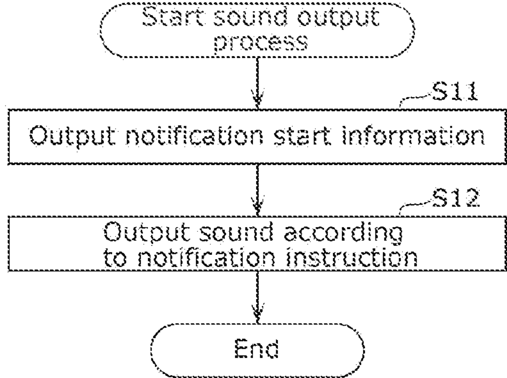
FIG. 4 is a flowchart showing example sound output process by the notification device.

FIG. 4 is a flowchart showing example sound output process by the notification device.

As described above, the sound output process starts if a notification instruction is determined to have been received from server 20 via network 60 (Yes in S1).

After the start of the sound output process, notification device 10A outputs notification start information (S11).

Notification device 10A outputs a sound according to the received notification instruction (S12).

Note that the sound output process continues as it is or stops in accordance with the timing at which the notification start information from the other notification device is obtained.

Figure 5:
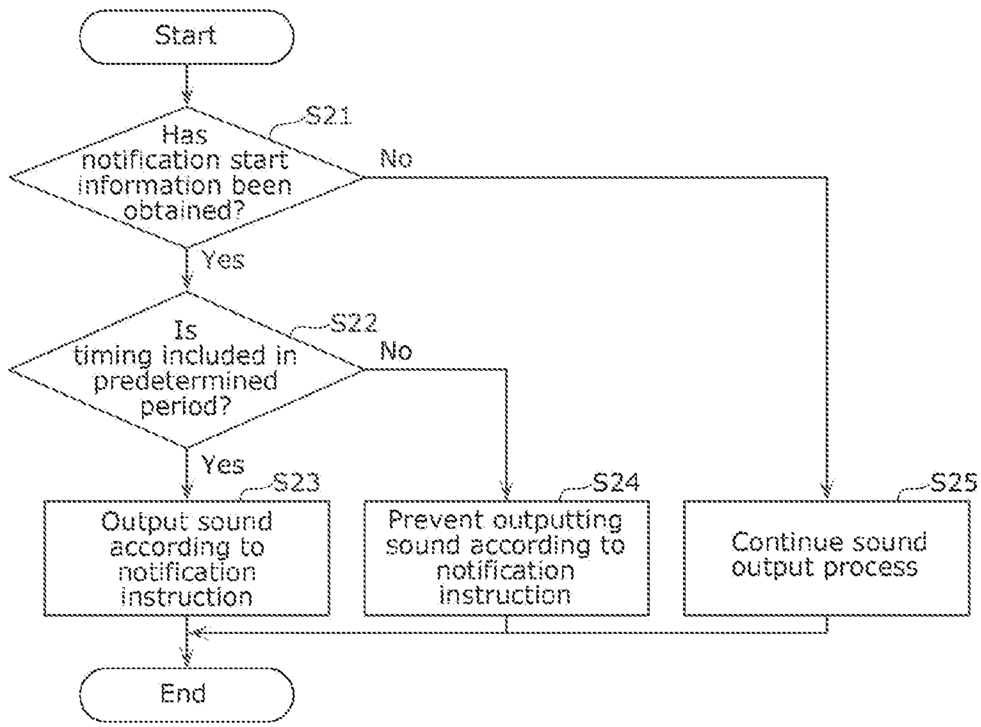
FIG. 5 is a flowchart showing example processing of determining whether to continue the sound output process.

FIG. 5 is a flowchart showing example processing of determining whether to continue the sound output process.

Notification device 10A determines whether the notification start information has been obtained (S21).

If it is determined that the notification start information has been obtained (Yes in S21), notification device 10A executes step S22. On the other hand, if it is determined that no notification start information has been obtained (No in S21), notification device 10A executes step S25.

In step S22, notification device 10A determines whether the timing at which the notification start information is obtained included in a predetermined period (S22). The predetermined period is after the second time period elapses from when notification device 10A has output the notification start information.

If the timing at which the notification start information is obtained determined to be included in a predetermined period (Yes in S22), notification device 10A executes step S23. On the other hand, of the timing at which the notification start information is obtained determined to be excluded from the predetermined period (No in S22), notification device 10A executes step S24. Note that the case where "the timing at which the notification start information is obtained excluded from the predetermined period" includes the following cases. In one case, the timing described above is included in a period before notification device 10A outputs the notification start information. In another case, the timing described above is included in the period from when notification device 10A has output the notification start information until when the second time period elapses.

In step S23, notification device 10A outputs a sound according to the notification instruction (S23). In this case, notification device 10A continues the sound output process and thus executes steps S11 and S12.

In step S24, notification device 10A prevents outputting any sound according to the notification instruction (S24). That is, notification device 10A stops the sound output process and thus does not execute step S12. Having started executing step S11 already, notification device 10A may continue step S11 and stop the sound output process after the end of step S11, or stop the sound output process in the middle of step S11.

In step S25, notification device 10A continues the sound output process (S25). That is, notification device 10A executes the sound output process until the end of steps S11 and S12.

Next, an example operation of notification system 1 will be described.

Figure 6:
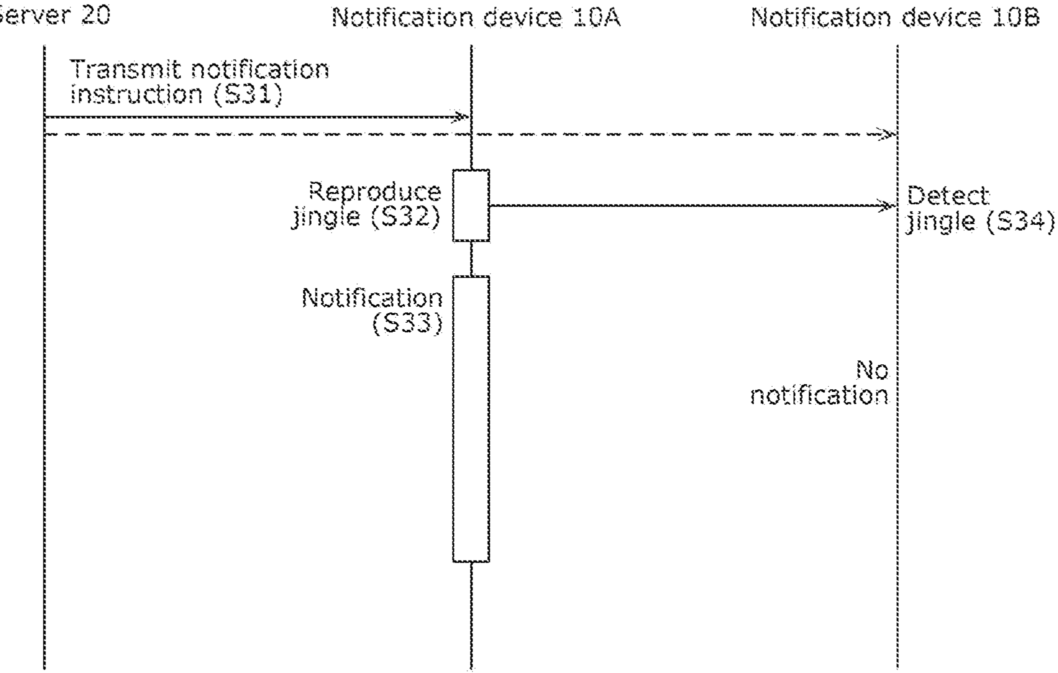
FIG. 6 is a sequence diagram for illustrating a first example of notification control in the notification system.

FIG. 6 is a sequence diagram for illustrating a first example of notification control in the notification system. The first example is a control example where notification device 10B detects a jingle from notification device 10A, before reproducing a jingle. In the first example, notification device 10A processes the notification instruction and reproduces the jingle earlier than notification device 10B.

Server 20 transmits a notification instruction to notification devices 10A and 10B (S31).

Notification device 10A receives the notification instruction, reproduces the jingle (S32), and makes a notification by outputting a sound according to the notification instruction (S33).

Before receiving the notification instruction, or before processing the notification instruction and reproducing the jingle, notification device 10B detects the jingle reproduced by notification device 10A (S34). Accordingly, "No" is determined in step S22 for notification device 10B which outputs no sound according to the notification instruction.

Figure 7:
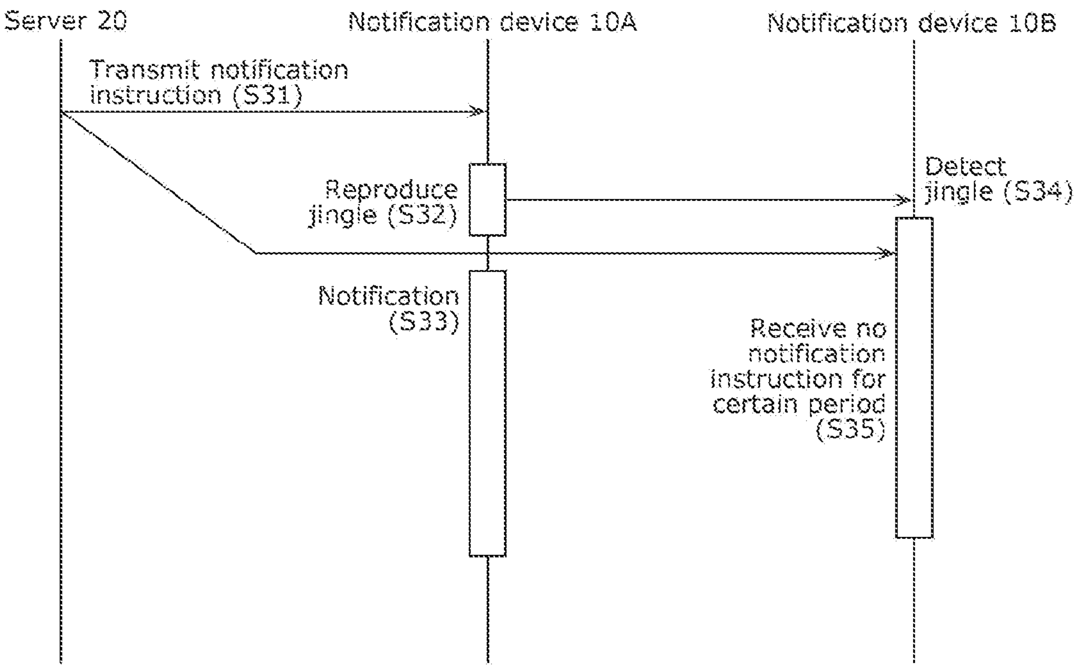
FIG. 7 is a sequence diagram for illustrating a second example of the notification control in the notification system.

FIG. 7 is a sequence diagram for illustrating a second example of the notification control in the notification system. The second example is, like the first example, a control example where notification device 10B detects a jingle from notification device 10A, before reproducing a jingle. In the second example, like in the first example, notification device 10A processes the notification instruction and reproduces the jingle earlier than notification device 10B. The second example is however different from the first example.

Steps S31 to S34 are the same as in the first example, the description thereof will thus be omitted.

After step S34, notification device 10B receives no notification instruction for a certain period (S35). Assume that the timing at which the notification start information output from the other notification device is obtained is included in a period before receiver 11 receives the notification instruction. In this case, notification device 10B receives no notification instruction until the first time period elapses after the timing described above.

For example, as shown in FIG. 7, the notification instruction transmitted from server 20 may be received by notification device 10B later than notification device 10A due to the differences in the transmission speed and the processing speed. Assume that the notification instruction is received when the first time period elapses after the timing at which the notification start information output from the other notification device is obtained. Notification device 10B receives no notification instruction, which reduces the output of the same sound at timing different from the timing at which notification device 10A outputs a sound.

Figure 8:
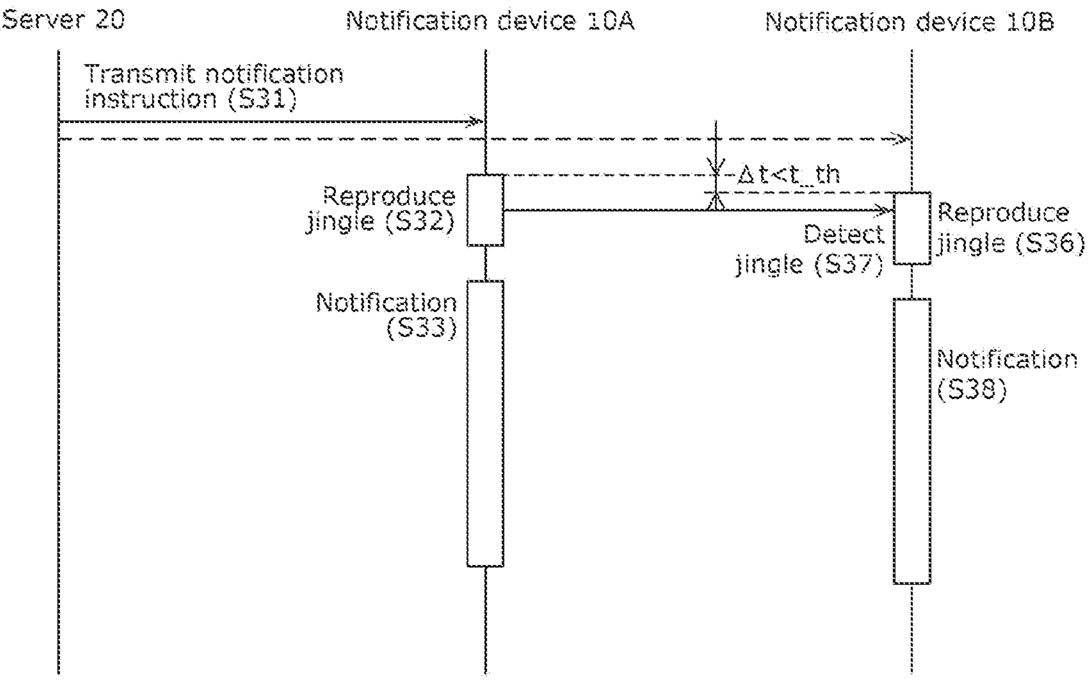
FIG. 8 is a sequence diagram for illustrating a third example of the notification control in the notification system.

FIG. 8 is a sequence diagram for illustrating a third example of the notification control in the notification system. The third example is a control example where notification device 10B detects a jingle reproduced by notification device 10A, after reproducing a jingle. In the third example, difference Δt between the timing at which notification device 10A has reproduced the jingle and the timing at which notification device 10B has reproduced the jingle is smaller than threshold t_th.

Steps S31 to S33 are the same as in the first example, the description thereof will thus be omitted.

Notification device 10B reproduces the jingle (S36) and then detects the other jingle (S37). Difference Δt between the timing at which notification device 10A has reproduced the jingle and the timing at which notification device 10B has reproduced the jingle is smaller than threshold t_th. "Yes" is thus determined in step S22 in notification device 10B. Accordingly, notification device 10B makes a notification by outputting a sound according to the notification instruction (S38).

Figure 9:
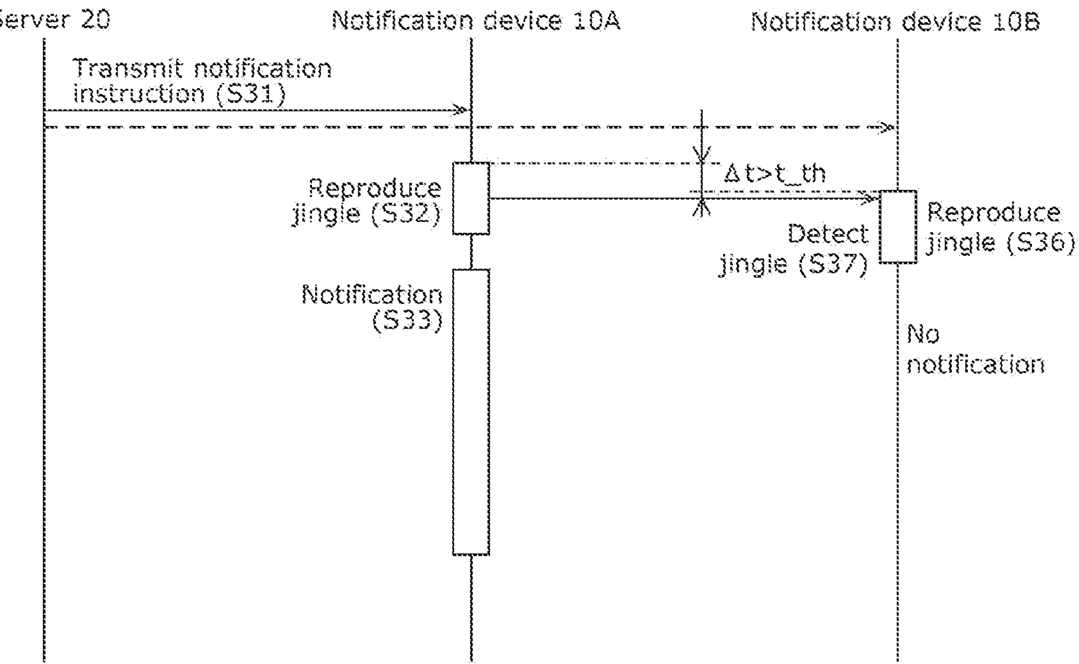
FIG. 9 is a sequence diagram for illustrating a fourth example of the notification control in the notification system.

FIG. 9 is a sequence diagram for illustrating a fourth example of the notification control in the notification system. The fourth example is, like the third example, a control example where notification device 10B detects a jingle reproduced by notification device 10A, after reproducing a jingle. In the fourth example, difference Δt between the timing at which notification device 10A has reproduced the jingle and the timing at which notification device 10B has reproduced the jingle is larger than threshold t_th.

Step S31 to S33 are the same as in the first example, the description thereof will thus be omitted.

Notification device 10B reproduces a jingle (S36) and then detects another jingle (S37). Difference Δt between the timing at which when notification device 10A has reproduced the jingle and the timing at which when notification device 10B has reproduced the jingle is larger than threshold t_th. "No" is thus determined in step S22 in notification device 10B. Accordingly, notification device 10B outputs no sound according to the notification instruction.

Assume that difference Δt between the timing at which notification device 10A has reproduced the jingle and the timing at which notification device 10B has reproduced the jingle is equal to threshold t_th. In this case, the processing of the third example or the fourth example may be executed.

[3. Advantages]

Notification device 10A according to this embodiment is communicably connected to server 20 via network 60, and includes receiver 11, outputter 14, obtainer 12, and controller 13. Receiver 11 receives a notification instruction from server 20. Once receiver 11 receives the notification instruction, outputter 14 outputs a sound according to the received notification instruction, after outputting notification start information. Obtainer 12 obtains the notification start information output from other notification device 10B. Controller 13 controls whether to cause outputter 14 to output a sound, based on the timing at which the notification start information from the other notification device is obtained.

This configuration controls whether to output a sound, based on the timing at which the notification start information from the other notification device is obtained. This reduces the output of the same sound, for example, if there is a large time difference from the timing at which other notification device 10B outputs a sound. If there is a small time difference, notification device 10A can output the same sound, together with other notification device 10B. Accordingly, even if there are the plurality of notification devices 10A and 10B that receive the notification instruction for outputting a sound, the user can hear the output sound easily.

In notification device 10A according to this embodiment, controller 13 prevents outputter 14 from outputting any sound, if the timing at which the notification start information is obtained included in a period before outputter 14 outputs the notification start information.

Assume that notification start information is obtained from other notification device 10B before the outputter outputs notification start information. In this case, it can be determined that there is a large time difference from when other notification device 10B outputs a sound, which reduces the output of the sound.

In notification device 10A according to this embodiment, if the timing at which the notification start information is obtained included in a period before outputter 14 outputs the notification start information, controller 13 may cause outputter 14 to not output the notification start information.

Assume that notification start information is obtained from other notification device 10B before outputter 14 outputs notification start information. In this case, it can be determined that there is a large time difference from when other notification device 10B outputs a sound. This reduces the output of the notification start information.

In notification device 10A according to this embodiment, if the timing at which the notification start information is obtained included in a period before the outputter outputs the notification start information, controller 13 receives no notification instruction until the first time period elapses after the timing described above.

With this configuration, no notification instruction is received until the first time period elapses after the notification start information from other notification device 10B has been obtained. This reduces output of the sound, which is the same as the sound output by other notification device 10B, with a delay from other notification device 10B, even if the notification instruction has been received with a delay.

In notification device 10A according to this embodiment, controller 13 causes outputter 14 to output a sound, if the timing at which the notification start information is obtained included in the period after the second time period elapses from when outputter 14 has output the notification start information.

Assume that notification start information is obtained from other notification device 10B in the period from when outputter 14 has output the notification start information until when the second time period elapses. In this case, it can be determined that there is a small time difference from when other notification device 10B outputs a sound. Notification device 10A can output the same sound, together with other notification device 10B. Accordingly, one of notification devices 10A and 10B obtains the notification start information from the other notification device. This reduces the problem that neither the notification devices outputs any sound, that is, the problem that neither sound notification device 10A nor other notification device 10B output any sound even after receiving a notification instruction.

In notification device 10A according to this embodiment, controller 13 prevents outputter 14 from outputting any sound, if the timing at which the notification start information is obtained is included in the period from when outputter 14 has output the notification start information until when the second time period elapses.

Assume that notification start information is obtained from other notification device 10B in the period from when outputter 14 has output the notification start information until when the second time period elapses. In this case, it can be determined that there is a large time difference from when other notification device 10B outputs a sound. This reduces the output of the same sound.

In notification device 10A according to this embodiment, outputter 14 outputs a jingle as the notification start information. Obtainer 12 obtains the notification start information by detecting the jingle in a space around notification device 10A.

As a result, the output and obtainment of the notification start information can be achieved by a simple configuration.

[4. Variation]

(1) In the embodiment described above, notification devices 10A and 10B are communicably connected to server 20 via network 60. The connection is not limited thereto. Notification devices 10A and 10B are not necessarily communicably connected to server 20. In addition, notification devices 10A and 10B are not necessarily connected to network 60. In this case, if any of predetermined conditions is met in the notification devices, outputters 14 of notification devices 10A and 10B may output a sound according to the predetermined conditions after outputting notification start information. The "predetermined conditions in the notification devices" include a plurality of conditions. The conditions includes, for example, that a predetermined time has come, that a predetermined operation is received from the user, and that a predetermined operation is executed at predetermined times. One of the "predetermined conditions" in the notification devices may be met. The "sound according to the predetermined conditions" in the notification devices may be associated with the conditions.

(2) In the embodiment described above, if reproduced in overlapping periods, the sounds output by notification devices 10A and 10B are in accordance with the same notification instruction and thus are the same sound. The sounds are not necessarily the same and may be different. Even if reproducing different sounds in overlapping periods, notification devices 10A and 10B output notification start information before reproducing the sounds. Thus, like the embodiment described above, whether to output a sound can be controlled based on the timing at which the notification start information from the other notification device is obtained.

[5. Others]

In the embodiment described above, each element may be achieved by dedicated hardware or by executing a software program suitable for the element. Each element may be achieved by a program executor, such as a central processing unit (CPU) or a processor, reading and executing a software program recorded in a recording medium, such as a hard disk drive (HDD) or a semiconductor memory. Here, the software for operating the system, the information terminal, the server, the camera equipment, or other elements in the embodiment described above is a program that causes a computer to execute the steps included in the flowcharts shown in the drawings.

Note that the present disclosure also includes the following cases.

(1) Specifically, the devices described above are each a computer system including a microprocessor, a read-only memory (ROM), a random-access memory (RAM), a hard disk unit, a display unit, a keyboard, a mouse, or other components. The RAM or the hard disk unit includes computer programs. The microprocessor operates in accordance with the computer programs so that the devices fulfill their functions. The computer programs are each obtained by combining a plurality of command codes indicating instructions to the computer to fulfill predetermined functions.

(2) Some or all of the components of the devices described above may be a single system large-scale integrated (LSI) circuit. The system LSI circuit is a super multifunctional LSI circuit manufactured by integrating a plurality of components on a single chip, and specifically is a computer system including a microprocessor, a ROM, a RAM, and other suitable components. The RAM stores computer programs. The microprocessor operates in accordance with the computer programs so that the system LSI circuit fulfills its functions.

(3) Some or all of the components of the devices described above are each an IC card or a single module attachable to and detachable from the devices. The IC card or the module is a computer system including a microprocessor, a ROM, a RAM, and other suitable components. The IC card or the module may include the super LSI circuit described above. The microprocessor operates in accordance with a computer program so that the IC card or the module fulfills its functions. This IC card or this module may have a resistance to tamper.

(4) The present disclosure may be directed to the method described above. Alternatively, the present disclosure may be directed to a computer program causing a computer to execute the method, or a digital signal indicating the computer program.

The present disclosure may be directed to the computer program or the digital signal recorded on a computer-readable recording medium, such as a flexible disk, a hard disk, a CD-ROM, a magneto-optical (MO) disk, a DVD, a DVD-ROM, a DVD-RAM, a Blu-ray (registered trademark) disk (BD), or a semiconductor memory. Alternatively, the present disclosure may be directed to a digital signal recorded in the recording medium.

The present disclosure may be directed to the computer program or the digital signal transmitted via a telecommunication line, a wired or wireless communication line, a network represented by the Internet, data broadcasting, or any other suitable means.

The present disclosure may be directed to a computer system including a microprocessor and a memory. The memory may store the computer program described above. The microprocessor may operate in accordance with the computer program described above.

The present disclosure may be directed to another independent computer system that records the program or the digital signal in the recording medium and transfers the recorded program or digital signal, or transfers the program or the digital signal via the network or any other suitable means.

(5) The embodiment and variation described above may be combined.

INDUSTRIAL APPLICABILITY

The present disclosure is useful as a notification device, and so on, that allow the user to hear an output sound easily, even if there are a plurality of notification devices that receive a notification instruction for outputting the sound.

The invention claimed is:

1. A notification device comprising:

an outputter that outputs a sound according to a predetermined condition after outputting notification start information, when the predetermined condition is met;

an obtainer that obtains notification start information output from an other notification device; and a controller that controls whether to cause the outputter to output the sound, based on timing at which the notification start information from the other notification device is obtained.

2. The notification device according to claim 1, wherein the notification device is communicably connected to a server via a network, the notification device further includes a receiver that receives a notification instruction from the server, and the predetermined condition is that the receiver receives the notification instruction.

3. The notification device according to claim 1, wherein when the timing is included in a period before the outputter has output the notification start information, the controller prevents the outputter from outputting the sound.

4. The notification device according to claim 3, wherein when the timing is included in a period before the outputter has output the notification start information, the controller prevents the outputter from outputting the notification start information.

5. The notification device according to claim 2, wherein when the timing is included in a period before the receiver receives the notification instruction, the controller does not receive the notification instruction until a first time period elapses from the timing.

6. The notification device according to claim 1, wherein when the timing is included in a period from when the outputter has output the notification start information until when a second time period elapses, the controller causes the outputter to output the sound.

7. The notification device according to claim 1, wherein when the timing is included in a period after a second time period elapses from when the outputter has output the notification start information, the controller prevents the outputter from outputting the sound.

8. The notification device according to claim 1, wherein the outputter outputs a jingle as the notification start information, and the obtainer obtains the notification start information from the other notification device by detecting the jingle in a space around the notification device.

9. A notification method comprising:

starting sound output process, when a predetermined condition is met, the sound output process being outputting a sound according to the predetermined condition after outputting notification start information;

obtaining notification start information output from an other notification device; and controlling whether to output the sound, based on timing at which the notification start information from the other notification device is obtained.

10. A non-transitory computer-readable recording medium having recorded thereon a program for causing a computer to execute the notification method according to claim 9.

11. A notification system comprising:

a server; and a first notification device and a second notification device communicably connected to the server, wherein the first notification device includes:

a first receiver that receives a notification instruction from the server; and a first outputter that outputs a sound according to the notification instruction received, after outputting notification start information, when the first receiver receives the notification instruction, and the second notification device includes:

a second receiver that receives the notification instruction from the server;

a second outputter that outputs a sound according to the notification instruction received, when the second receiver receives the notification instruction;

an obtainer that obtains notification start information output from the first notification device; and a controller that controls whether to cause the second outputter to output the sound, based on timing at which the notification start information from the first notification device is obtained.

* * * * *